UNITED STATES PATENT OFFICE.

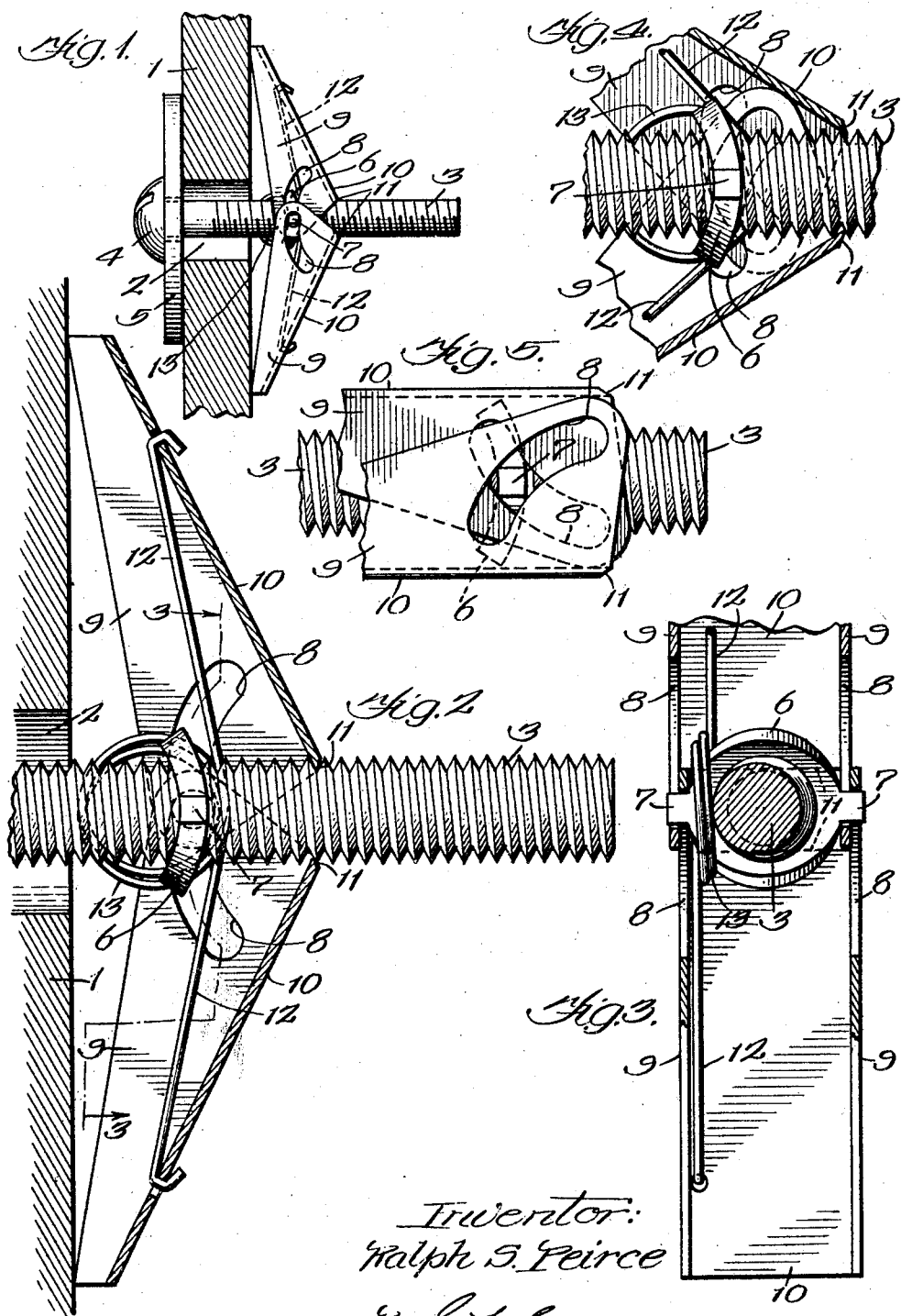

RALPH S. PEIRCE, OF HINSDALE, ILLINOIS.

TOGGLE-BOLT.

1,357,821.        Specification of Letters Patent.      Patented Nov. 2, 1920.

Application filed November 10, 1919. Serial No. 337,016.

*To all whom it may concern:*

Be it known that I, RALPH S. PEIRCE, citizen of the United States, residing at Hinsdale, in the county of Dupage and State of Illinois, have invented a certain new and useful Improvement in Toggle-Bolts, of which the following is a full, clear, concise, and exact description.

My invention relates to toggle bolts that employ pairs of wings and has for its general object an improved construction of the toggle bolt and an improved interrelation of the component parts thereof.

In accordance with one characteristic of the invention the bolt passes between the inner ends of the wings that have fulcruming support upon the bolt, or otherwise, during the major and concluding portion of the opening movement of the wings, the wings preferably having lateral extensions which are combined with means coöperating therewith for limiting the spread of the wings, there being desirably also a spring for spreading the wings and maintaining the inner ends thereof in their fulcruming engagement.

The device of my invention has other features of construction aside from those hitherto mentioned and all of the features of the invention will be better understood by a description of the preferred embodiment of the invention shown in the accompanying drawing in which Figure 1 is a sectional view through a support upon which a toggle bolt of my invention is carried; Fig. 2 is a view on a larger scale of parts illustrated in Fig. 1, the wing portions of the structure being shown in section; Fig. 3 is a sectional view on line 3—3 of Fig. 2; Fig. 4 is a view of parts illustrated in Fig. 2 in changed positions; and Fig. 5 is a view of parts illustrated in Fig. 1 in changed positions.

Like parts are indicated by similar characters of reference throughout the different figures.

The device of my invention is adapted for assembly with any suitable form of object such as a support 1 which has an opening 2 formed therethrough through which the bolt 3 is passed. This bolt is preferably threaded to form a screw and desirably has a head 4 for receiving an object 5 between the bolt head and the support. A nut 6 is threaded upon the bolt and has projections 7 receivable in arcuate channels, preferably in the form of slots 8 formed in the lateral extensions 9 of the wings 10. The inner ends 11 of the wings are in fulcrum engagement with the bolt which is passed therebetween. The arcuate channels 8 desirably have their centers of curvature at the inner ends of the wings whereby the projections 7 upon the nut may be shifted toward and from the wings to permit the wings to fold and unfold or spread.

The inner ends of the wings, in those constructions where the stem of the bolt or screw passes between such wing ends, have fulcruming support preferably upon the stem of the bolt during the major and concluding portion of the opening movement of the wings. This fulcruming engagement of the inner ends of the wings is maintained by means of a spring 12 coiled at its midportion 13, this spring serving to press the inner ends of the wings toward and into engagement with the bolt during such major portion of the opening movement of the wings and also serving to spread the wings apart. The extent to which the wings may be spread apart is preferably limited by means of either or both of the projections 7 entering slots 8 adjacent thereto, that end of each slot entered by such projection which is remote from the wing carrying the extension having such slot, being engaged by such projection to limit the extent to which the wings may be spread apart by the spring and also by the tension exerted by the bolt. In one aspect both projections 7 upon opposite sides of the bolt serve to limit the spreading movement of the wings, these projections entering slots upon the extensions of the wings, it being only necessary that each projection enter but one slot, the slot entered by one projection being upon the lateral extension of one wing and the slot entered by the other projection being upon the lateral extension of the other wing.

In another aspect of the invention a single projection 7 will suffice to limit the spreading movement of the wings, in which event this projection will enter the slots in the adjacent lateral wing extensions, each wing extension belonging to a different wing. Where the projections 7 are upon the nut which is in changeable engagement with the shank of the bolt by being threaded thereon, such nut and the slots 8 are so relatively formed that the nut may be passed through the slots in the process of its assembly with the shank of the bolt, it being obvious that this need only be true with reference to one side of the structure. Said slots being of arcuate form the nut is preferably dished with a curvature conforming to the curvature of the slots so that the nut may be readily passed through the slots whereafter it should be reversed before the bolt is engaged with the bore of the nut in order that the nut may not issue to any material extent outwardly through the slots although such reversal of the nut is not indispensable nor is the invention to be limited to the dish formation of the nut and the arcuate formation of the slots.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. The combination with a bolt; of a pair of wings between whose inner ends the bolt passes and which inner wing ends, where the bolt passes therebetween, have fulcruming support during the major and concluding portion of the opening movement of the wings; means for limiting the spread of the wings; and a spring for spreading the wings and maintaining the inner ends thereof in their fulcruming engagement.

2. The combination with a bolt; of a pair of wings between whose inner ends the bolt passes and which inner wing ends, where the bolt passes therebetween, have fulcruming support upon the bolt during the major and concluding portion of the opening movement of the wings; means for limiting the spread of the wings; and a spring for spreading the wings and maintaining the inner ends thereof in their fulcruming engagement with the bolt.

3. The combination with a bolt; of a pair of wings between whose inner ends the bolt passes and which inner wing ends, where the bolt passes therebetween, have fulcruming support during the major and concluding portion of the opening movement of the wings, said wings having lateral extensions combined with means coöperating therewith for limiting the spread of the wings.

4. The combination with a bolt; of a pair of wings between whose inner ends the bolt passes and which inner wing ends, where the bolt passes therebetween, have fulcruming support upon the bolt during the major and concluding portion of the opening movement of the wings, said wings having lateral extensions combined with means coöperating therewith for limiting the spread of the wings.

5. The combination with a bolt; of a pair of wings between whose inner ends the bolt passes and which inner wing ends, where the bolt passes therebetween, have fulcruming support during the major and concluding portion of the opening movement of the wings, said wings having lateral extensions combined with means coöperating therewith for limiting the spread of the wings; and a spring for spreading the wings and maintaining the inner ends thereof in their fulcruming engagement.

6. The combination with a bolt; of a pair of wings between whose inner ends the bolt passes and which inner wing ends, where the bolt passes therebetween, have fulcruming support upon the bolt during the major and concluding portion of the opening movement of the wings; said wings having lateral extensions combined with means coöperating therewith for limiting the spread of the wings; and a spring for spreading the wings and maintaining the inner ends thereof in their fulcruming engagement with the bolt.

7. The combination with a bolt; of a pair of wings having lateral extensions which overlap at their inner ends, at least one of these lateral extensions having a channel formation extending from the wing carrying this extension toward the other wing; a projection carried by the bolt entering such channel and engageable with the outer end thereof which is remote from the wing carrying the extension having the channel to limit the spread of the wings; and a spring for spreading the wings.

8. The combination with a bolt; of a pair of wings having lateral extensions which overlap at their inner ends, each lateral extension having a channel formation extending from the wing carrying this extension toward the other wing; a projection carried by the bolt entering each channel and engageable with the outer end thereof which is remote from the wing carrying the extension having this channel to limit the spread of the wings; and a spring for spreading the wings.

9. The combination with a bolt; of a pair of wings having lateral extensions between which the bolt is passed, each lateral extension having a channel formation extending from the wing carrying this extension toward the other wing; projections upon opposite sides of and carried by the bolt, each projection entering the channel in the contiguous lateral wing extension and engageable with the end of this channel which is remote from the wing carrying the extension having this channel to limit the spread of the wings; and a spring for spreading the wings.

10. The combination with a threaded bolt; of a pair of wings having lateral extensions between which the bolt is passed, each lateral extension having a channel formation, one of these channel formations being in the form of a slot; a nut upon the bolt and carrying projections upon its opposite sides, each projection entering the channel in the contiguous lateral wing extension and engageable with the end of this channel which is remote from the wing carrying the extension having this channel to limit the spread of the wings, the channel of slot formation and the nut being relatively formed to permit of the passage of the nut through said channel of slot formation in the process of assembly; and a spring for spreading the wings.

11. The combination with a threaded bolt; of a pair of wings having lateral extensions which overlap at their inner ends, each lateral extension having a slot therein extending from the wing carrying this extension toward the other wing; a nut upon the bolt having a projection entering each slot and engageable with the outer end thereof which is remote from the wing carrying the extension having this slot to limit the spread of the wings, said slots and nut being relatively formed to permit of the passage of the nut therethrough in the process of assembly; and a spring for spreading the wings.

In witness whereof, I hereunto subscribe my name this fourteenth day of October, A. D. 1919.

RALPH S. PEIRCE.